US008147914B2

(12) United States Patent
Jung et al.

(10) Patent No.: US 8,147,914 B2
(45) Date of Patent: Apr. 3, 2012

(54) ORIENTATION-CONTROLLED SELF-ASSEMBLED NANOLITHOGRAPHY USING A BLOCK COPOLYMER

(75) Inventors: Yeon Sik Jung, Cambridge, MA (US); Caroline A. Ross, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 929 days.

(21) Appl. No.: 12/137,016

(22) Filed: Jun. 11, 2008

(65) Prior Publication Data

US 2008/0311402 A1 Dec. 18, 2008

Related U.S. Application Data

(60) Provisional application No. 60/943,376, filed on Jun. 12, 2007.

(51) Int. Cl.
*B05D 3/02* (2006.01)
(52) U.S. Cl. ............... 427/384; 427/256; 427/372.2; 427/553; 427/534; 427/535; 427/536; 216/2; 216/39; 216/58; 216/67; 977/888; 977/895; 977/900
(58) Field of Classification Search .................. None
See application file for complete search history.

(56) References Cited

U.S. PATENT DOCUMENTS

| | | | | |
|---|---|---|---|---|
| 6,565,763 | B1 * | 5/2003 | Asakawa et al. | 216/56 |
| 7,790,045 | B1 * | 9/2010 | Chuang et al. | 216/2 |
| 7,931,819 | B2 * | 4/2011 | Kihara et al. | 216/41 |
| 2005/0208752 | A1 * | 9/2005 | Colburn et al. | 438/619 |
| 2008/0038467 | A1 * | 2/2008 | Jagannathan et al. | 427/256 |

OTHER PUBLICATIONS

Cheng et al, Advanced Materials, Mar. 2006, vol. 18, pp. 597-601.*
Cheng et al., "Nanostructure engineering by templated self-assembly of block copolymers" 2004 Nature Materials, vol. 3, pp. 823-828.
Black, "Self-aligned self assembly of multi-nanowire silicon field effect transistors" Applied Physics Letters 87, 2005, pp. 163116-1-163116-3.
Sundrani et al., "Guiding Polymers to Perfection Macroscopic Alignment of Nanoscale Domains" 2004 American Chemical Society, Nano Letters vol. 4, No. 2, pp. 273-276.
Sundrani et al., "Spontaneous Spatial Alignment of Polymer Cylindrical Nanodomains on Silicon Nitride Gratings" Macromolecules 2002, 35, pp. 8531-8539.
Angelescu et al., "Macroscopic Orientation of Block Copolymer Cylinders in Single-Layer Films by Shearing" Advanced Materials 2004, No. 19, pp. 1736-1740.

(Continued)

*Primary Examiner* — Erma Cameron
(74) *Attorney, Agent, or Firm* — Gesmer Updegrove LLP

(57) ABSTRACT

Disclosed is a structure made of a trench patterned substrate having a pre-determined trench period and a pre-determined mesa to trench width ratio, and a block copolymer on top of the trench patterned substrate. The block copolymer has at least an organic block and a silicon-containing block, wherein the block copolymer can have either perpendicular or parallel cylinders. The structure is annealed under a pre-determined vapor pressure for a predetermined annealing time period, wherein the pre-determined trench period, the pre-determined mesa to trench width ratio, the predetermined vapor pressure and the predetermined annealing time period are chosen such that cylinders formed in the block copolymer are either perpendicular or parallel with respect to the trench-patterned substrate. A method is also described to form the above-mentioned structure.

14 Claims, 5 Drawing Sheets

OTHER PUBLICATIONS

Jung et al., "Orientation-Controlled Self-Assembled Nanolithography Using a POlydimethylsiloxane Block Copolymer" 2007 American Chemical Society, Nano Letters vol. 7, pp. 2046-2050.

* cited by examiner

ORIENTATION-CONTROLLED SELF-ASSEMBLED NANOLITHOGRAPHY USING A BLOCK COPOLYMER

PRIORITY INFORMATION

This application claims priority from U.S. provisional application 60/943,376 filed Jun. 12, 2007.

BACKGROUND OF THE INVENTION

1. Field of Invention

The present invention relates generally to the field of nanolithography. More specifically, the present invention is related to self-assembled nanolithography using a polystyrene-polydimethylsiloxane or other Si-containing block copolymer, in which the orientation of the block copolymer domains can be controlled.

2. Discussion of Prior Art

The growing demand for nanoscale fabrication methods, combined with the inherent feature-size limitations of optical lithography and the low throughput of electron-beam lithography, have motivated a search for cost-effective nanoscale fabrication technologies, including nanoimprint lithography, dip-pen nanolithography, and block copolymer lithography. In the case of block copolymer lithography, the use of a chemical or topographical template enables control over the long range order of the self-assembled patterns, providing a simple and scalable nanopatterning method in which the feature sizes and geometries are controlled via the chain length and volume fractions of the block copolymer.

In block copolymer lithography, arrays of holes or dots may be defined using a spherical-morphology block copolymer or a cylindrical-morphology block copolymer with the cylinders oriented perpendicular to the substrate. In contrast, patterns consisting of parallel lines may be defined using a cylindrical-morphology block copolymer with the cylinders parallel to the surface or a lamellar block copolymer with a perpendicular orientation. Such patterns have been templated using both chemical and topographical substrate features. For example, lamellar poly (styrene-b-polymethyl methacrylate) (PS-PMMA) patterns have been templated using a chemical pattern formed using extreme ultraviolet interference lithography (EUV-IL) or electron-beam (e-beam) lithography, and have attracted much attention due to their high aspect ratio and absence of defects. However, this process requires template generation on the same lengthscale as the period of the block copolymer. On the other hand, well-ordered arrays of in-plane cylinders templated by larger scale topographical patterns have been demonstrated by several groups. Horizontal cylinders from diblock copolymers such as poly (styrene-b-ethylene propylene) (PS-PEP) and PS-PMMA have been successfully aligned in topographical templates. The templates have critical dimensions an order of magnitude or more than the block copolymer period, and can be made by optical lithography.

In all these examples the removal of one block leaves a structure made from the other block, typically PS, that could be used as a mask for pattern transfer into a functional material. PS is, however, a rather poor mask, having a glass transition temperature of 100° C. and relatively low etch resistance. It is therefore desirable to instead use a block copolymer containing one etch-resistant block in order to facilitate pattern transfer. In addition, in these block copolymers a small but significant number of defects (dislocations or disinclinations) remain, which is undesirable for nanolithographic applications. The defect population is related to the Flory-Huggins interaction parameter, $\chi$, which describes the driving force for microphase separation in the block copolymer. Block copolymers with higher $\chi$ have a higher driving force for reducing the defect population, and are therefore more desirable for achieving long range ordering.

The following references provide a general background teaching in the area of block copolymer lithography:

The paper of Sundrani et al. titled "Guiding polymers to perfection: macroscopic alignment of nanoscale domains" teaches a method wherein nanoscale diblock copolymer domains are aligned within topographical trenches via top-down/bottom-up hierarchical assembly. Sundrani et al. teach that depending on trench depth and amount of deposited polymer, aligned domains are (1) confined to the trenches or (2) expanded across the trenches frequently with (3) a complete absence of defects.

The paper of Black titled "Self-aligned self assembly of multi-nanowire silicon field effect transistors" discusses the efficacy of diblock copolymer self assembly for solving key fabrication challenges of aggressively scaled silicon field effect transistors.

The paper of Cheng et al. titled "Nanostructure engineering by templated self-assembly of block copolymers" discusses the formation of defects in a self-assembled array of spherical block-copolymer microdomains using topographical templates to control the local self-assembly.

The paper of Sundrani et al. titled "Spontaneous spatial alignment of polymer cylindrical nanodomains on silicon nitride gratings" teaches a simple method to align lying-down cylindrical domains of PS-b-PMMA in the trench regions of 555 nm deep silicon nitride gratings without the aid of an external orientation field.

The paper of Angelescu et al. titled "Macroscopic Orientation of Block Copolymer Cylinders in Single-Layer Films by Shearing" teaches shear-induced ordering of cylindrical block copolymers.

Whatever the precise merits, features, and advantages of the above cited references, none of them achieves or fulfills the purposes of the present invention.

SUMMARY OF THE INVENTION

The present invention allows for the controlled orientation of block copolymer microdomains on a substrate patterned with topographical features such as trenches, by choice of the block copolymer composition, the trench geometry and the annealing conditions.

In one embodiment, the present invention provides for a method that comprises the steps of: (a) applying (for example, via spin-casting) a block copolymer on top of a trench patterned substrate (made, for example, from silicon or silica) having a pre-determined trench period (picked for example, between 10 nm and 1 mm) and mesa to trench width ratio (picked, for example, between 0.01 and 10), wherein the block copolymer comprising at least an organic block (e.g., polystyrene, polyisoprene, polybutadiene, polymethylmethacrylate, polyethylene oxide, or polyvinylpyridine) and a silicon-containing block (e.g., polydimethylsiloxane, polyethylmethylsiloxane, polyphenylmethylsiloxane, polydiethylsiloxane, polyvinylmethylsiloxane, or polyferrocenyldimethylsilane); (b) annealing the structure of (a) under a pre-determined vapor pressure (the pre-determined vapor pressure can be achieved via picking a surface to empty volume ratio R between the surface area of the liquid solvent used in the annealing and a volume of the chamber in which the annealing takes place, wherein the ratio R, for example, is between 0.01 cm$^{-1}$ and 10 cm$^{-1}$; alternatively, the pre-determined vapor pressure can be achieved by flowing vapor at a pre-determined rate through the annealing chamber) for a pre-determined annealing time period (picked, for example, between 1 minute and 100 hours). The pre-determined trench period, the pre-determined mesa to trench width ratio, the predetermined vapor pressure and the predetermined annealing time period are chosen such that cylinders formed in the block copolymer lie in plane but are either perpendicular or parallel with respect to the edges of the trenches.

In an extended embodiment, the method further comprises the step of subjecting the structure of (b) to a plurality of plasma treatments to remove the organic block, leaving cylinders associated with the silicon-containing block on the trench-patterned substrate. For example, the plurality of plasma treatments can be two plasma treatments—one with a $CF_4$ plasma and another with an $O_2$ plasma.

In another embodiment, the present invention also provides for a structure comprising: (a) a trench patterned substrate (made, for example, from silicon or silica) having a pre-determined trench period (picked for example, between 10 nm and 1 mm) and mesa to trench width ratio (picked, for example, between 0.01 and 10); (b) a block copolymer on top of the trench patterned substrate, the block polymer comprising at least an organic block (e.g., polystyrene, polyisoprene, polybutadiene, polymethylmethacrylate, polyethylene oxide, or polyvinylpyridine) and a silicon-containing block (e.g., polydimethylsiloxane, polyethylmethylsiloxane, polyphenylmethylsiloxane, polydiethylsiloxane, polyvinylmethylsiloxane, or polyferrocenyldimethylsilane), the block copolymer having parallel cylinders aligned either perpendicular or parallel to the trench edges. In this embodiment, the structure is annealed under a predetermined vapor pressure (the pre-determined vapor pressure can be achieved via picking a surface to empty volume ratio R between the surface area of a liquid solvent used in the annealing and the volume of the annealing chamber used in the annealing, wherein the ratio R, for example, is between 0.01 $cm^{-1}$ and 10 $cm^{-1}$; alternatively, the pre-determined vapor pressure can be achieved by flowing vapor at a predetermined rate through the annealing chamber) for a pre-determined annealing time period (picked, for example, between 1 minute and 100 hours), wherein the pre-determined trench period, the pre-determined mesa to trench width ratio, the predetermined vapor pressure and the predetermined annealing time period are chosen such that cylinders formed in the block copolymer are either perpendicular or parallel with respect to the trench edges.

In an extended embodiment, the structure is further subjected to a plurality of plasma treatments to remove the organic block, leaving cylinders associated with the silicon-containing block on the trench-patterned substrate. For example, the plurality of plasma treatments can be two plasma treatments—one with a $CF_4$ plasma and another with $O_2$ plasma.

BRIEF DESCRIPTION OF THE DRAWINGS

FIG. 4(a)-(c) illustrate SEM images of (a), (b) parallel cylinders on trench substrates with narrow mesas ($W_{mesa}$=125 nm and $W_{trench}$=875 nm) under a high vapor pressure of toluene (condition Eα from FIG. 3) and (c) perpendicular cylinders in a wide-mesa pattern at a lower vapor pressure (condition Bβ).

DESCRIPTION OF THE PREFERRED EMBODIMENTS

Figure 1A:
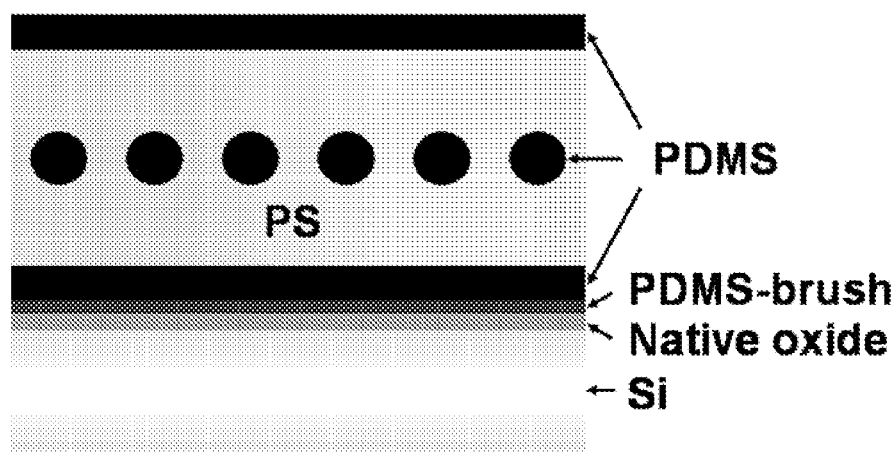
FIG. 1(a) illustrates a schematic cross-section of a film of PS-PDMS on a PDMS brush-treated silica surface.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The ideal block copolymer for nanolithography applications exhibits both a high value of $\chi$ and one highly etch-resistant block. Examples of such advantageous block copolymers are materials wherein one block is organic and easily etched (e.g. polystyrene, polyisoprene, polybutadiene, etc.) and the other contains Si, Fe or other components rendering it etch resistant (e.g. polydimethylsiloxane, polyferrocenyldimethylsilane, etc.) Poly(styrene-b-dimethylsiloxane) (PS-PDMS) block copolymers satisfy both criteria. The high density of Si in the backbone of PDMS provides extremely high etch contrast between the two blocks when treated in an oxygen plasma, which is advantageous for pattern transfer into underlying materials, and the large interaction parameter $\chi$ enables the formation of ordered structures with a large correlation length. Moreover, PDMS has been widely utilized in soft lithography and micro/nanofluidic devices, and ordered PDMS block copolymer patterns may be expected to have extensive applications in nano- and biological technologies. PS-PDMS has been studied in the bulk, and has been used in forming polymer blends, but its templating behavior and applications in nanolithography have not been reported.

A diblock copolymer of PS-PDMS with overall molecular weight of 45.5 kg/mol and volume fraction of PDMS $f_{DMS}$=33.5% was custom made by Polymer Source, Inc. The substrates used in this experiment consisted of smooth or trench-patterned Si substrates with native oxide layers. The 40-nm deep periodic trench patterns were fabricated using a Lloyd's Mirror interference lithography system with a 325 nm wavelength He—Cd laser to expose grating patterns in a trilayer resist, combined with reactive ion etching to transfer the grating into the substrate. The period of the trenches was close to 1 μm, and the mesa width was varied between 125 and 500 nm. In some experiments, the surfaces were modified by hydroxy-terminated PS or PDMS homopolymer with molecular weight 5 kg/mol, which was spun-cast on the substrates and annealed at 150° C. for 15 hours, then washed with toluene to remove unreacted material.

Toluene solutions of 1.5% by weight of the block copolymer were spun cast on the substrates, then the samples were solvent-annealed under toluene vapor at room temperature for 4 to 70 hours. The vapor pressure of toluene was controlled via the ratio R between the surface area of the liquid solvent and the volume of the annealing chamber. During solvent annealing, the block copolymer flows from the mesas to the trenches. The as-spun block copolymer film thickness was chosen so that, after solvent annealing, a monolayer of cylinders was present within the trenches while the mesas were left clear of cylinders. The annealed film was treated with a 5 sec, 50 W $CF_4$ plasma then a 90 W $O_2$ plasma to remove the PS leaving oxygen-plasma-modified PDMS cylinders on the substrate. The surface morphology was observed using a Zeiss/Leo Gemini 982 scanning electron microscope (SEM) operated with an acceleration voltage of 5 kV.

Figure 1B:
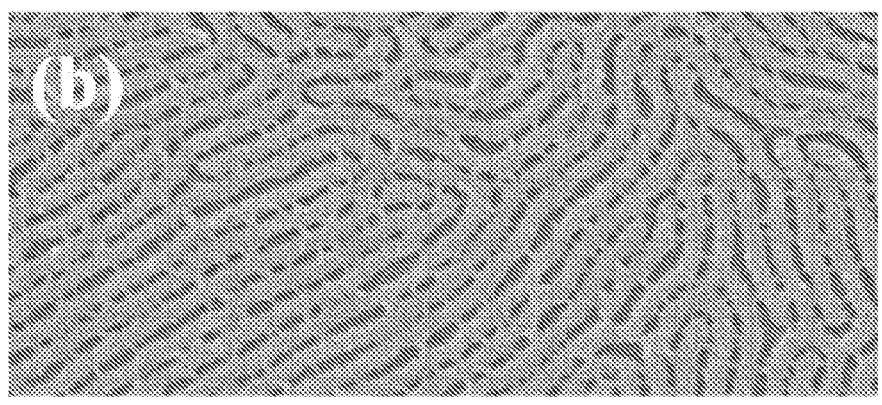
FIG. 1(b) illustrates SEM images of the film of 1(a) after exposure to $O_2$ plasma.
Figure 1C:
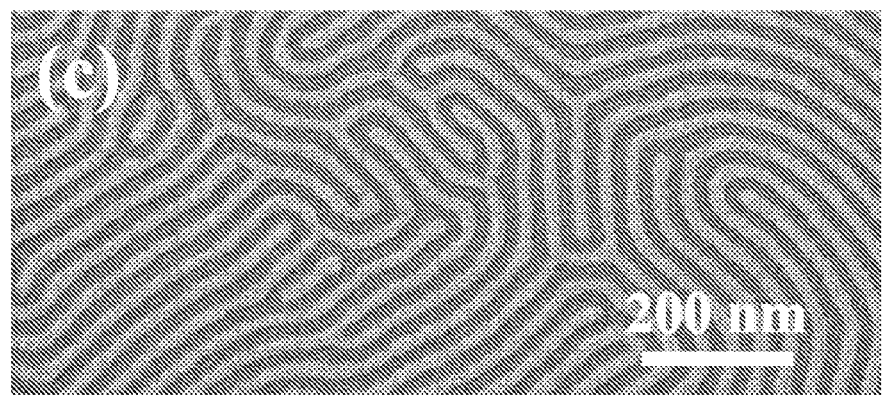
FIG. 1(c) illustrates SEM images of the film of 1(b) after exposure to $CF_4$ plasma.

The surface tension of PDMS ($\gamma$=19.9 mN/m) exceeds that of PS ($\gamma$=40.7 mN/m), and thus PDMS preferentially segregates at the air/polymer interface. This produces the structure shown schematically in FIG. 1a for a film formed on a PDMS-brush coated substrate. The thin continuous PDMS surface layer is resistant to an oxygen plasma, and an oxygen etch alone fails to produce sharp domain patterns (FIG. 1b). Therefore, a short (5 sec) $CF_4$ plasma treatment was performed to remove the PDMS surface layer before the oxygen plasma processing. FIG. 1c shows the results of this etching, which on a smooth substrate produces well-defined in-plane cylinder patterns without long range order.

The structure in FIG. 1c is characterized by low edge roughness. The edge roughness is believed to scale with the thickness of the inter-material dividing surface (IMDS), which delineates the two blocks, and this is minimized by a high $\chi$ parameter. The $\chi$ parameter of PS-PDMS ($\chi$~0.26) at room temperature is considerably larger than those of PS-PMMA ($\chi$~0.06), poly(styrene-b-isoprene) ($\chi$~0.09), poly (styrene-b-2-vinylpyridine) ($\chi$~0.18), and poly(styrene-b-ethylene oxide) ($\chi$~0.08), leading to a thinner IMDS and low pattern edge roughness.

The present invention, therefore, provides for a method that comprises the steps of: (a) applying (for example, via spin-casting) a block copolymer on top of a trench patterned substrate (made, for example, from silicon or silica) having a predetermined trench period (picked for example, between 10 nm and 1 mm) and mesa to trench width ratio (picked, for example, between 0.01 and 10), wherein the block copolymer comprising at least an organic block (e.g., polystyrene, polyisoprene, polybutadiene, polymethylmethacrylate, polyethylene oxide, or polyvinylpyridine) and a silicon-containing block (e.g., polydimethylsiloxane, polyethylmethylsiloxane, polyphenylmethylsiloxane, polydiethylsiloxane, polyvinylmethylsiloxane, or polyferrocenyldimethylsilane); (b) annealing the structure of (a) under a pre-determined vapor pressure (the pre-determined vapor pressure can be achieved via picking a surface to empty volume ratio R between the surface area of the liquid solvent used in the annealing and a volume of the chamber in which the annealing takes place, wherein the ratio R, for example, is between 0.01 $cm^{-1}$ and 10 $cm^{-1}$; alternatively, the pre-determined vapor pressure can be achieved by flowing vapor at a pre-determined rate through the annealing chamber) for a pre-determined annealing time period (picked, for example, between 1 minute and 100 hours). The pre-determined trench period, the pre-determined mesa to trench width ratio, the predetermined vapor pressure and the predetermined annealing time period are chosen such that cylinders formed in the block copolymer lie in plane but are either perpendicular or parallel with respect to the edges of the trenches.

The present invention also provides for a structure comprising: (a) a trench patterned substrate (made, for example, from silicon or silica) having a pre-determined trench period (picked for example, between 10 nm and 1 mm) and mesa to trench width ratio (picked, for example, between 0.01 and 10); (b) a block copolymer on top of the trench patterned substrate, the block polymer comprising at least an organic block (e.g., polystyrene, polyisoprene, polybutadiene, polymethylmethacrylate, polyethylene oxide, or polyvinylpyridine) and a silicon-containing block (e.g., polydimethylsiloxane, polyethylmethylsiloxane, polyphenylmethylsiloxane, polydiethylsiloxane, polyvinylmethylsiloxane, or polyferrocenyldimethylsilane), the block copolymer having parallel cylinders aligned either perpendicular or parallel to the trench edges. In this embodiment, the structure is annealed under a pre-determined vapor pressure (the pre-determined vapor pressure can be achieved via picking a surface to empty volume ratio R between the surface area of a liquid solvent used in the annealing and the volume of the annealing chamber used in the annealing, wherein the ratio R, for example, is between 0.01 $cm^{-1}$ and 10 $cm^{-1}$; alternatively, the pre-determined vapor pressure can be achieved by flowing vapor at a predetermined rate through the annealing chamber) for a pre-determined annealing time period (picked, for example, between 1 minute and 100 hours), wherein the pre-determined trench period, the pre-determined mesa to trench width ratio, the predetermined vapor pressure and the predetermined annealing time period are chosen such that cylinders formed in the block copolymer are either perpendicular or parallel with respect to the trench edges.

Figure 2A:
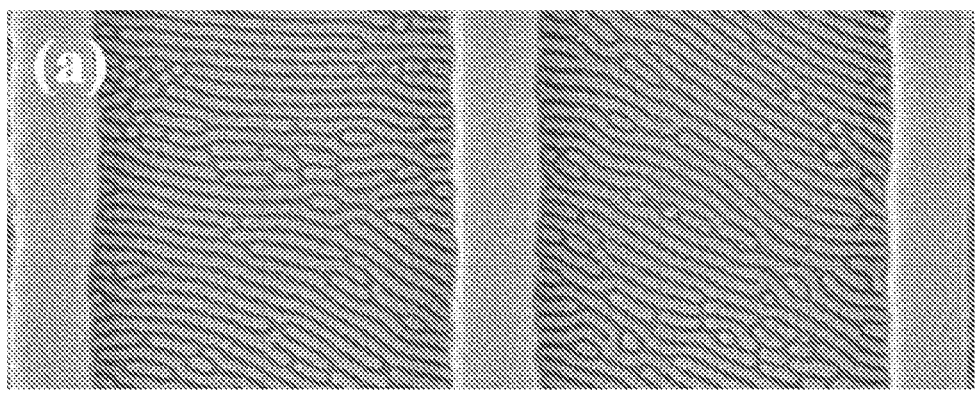
FIG. 2(a)-(c) illustrate SEM images of PS-PDMS on trench substrates without a brush (FIG. 2(a)), with a PS-brush (FIG. 2(b)), and with a PDMS brush (FIG. 2(c)).
Figure 2B:
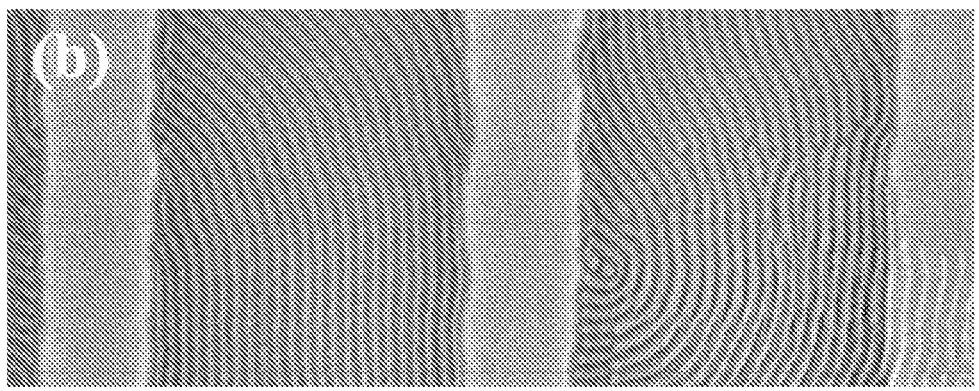
Figure 2C:
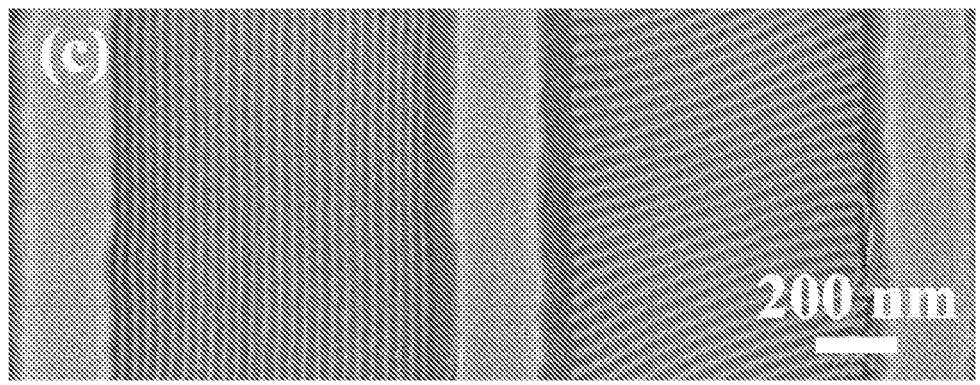

To illustrate the role of surface chemistry, FIGS. 2a, b and c show the cylinder morphology on three different trench-patterned substrates pre-coated with no brush, a PS-brush, and a PDMS-brush, respectively. The PS-PDMS on bare Si (FIG. 2a) shows a disordered structure with some perpendicular and some in-plane cylinders, which is assumed to result from the strong interaction between the PDMS block and the hydroxyl-terminated polar native oxide surface. On a PS-brush coated substrate (FIG. 2b), uniform cylinders form, but the ordering within the trenches is poor. On a PDMS-brush coated surface (FIG. 2c), the degree of ordering of the cylinders within the trenches is markedly improved, and correlation lengths of tens of microns are observed in some trenches. These remarkable differences are attributed to the extremely low surface energy of the PDMS surface. The flexibility of the Si—O backbone enables the molecules of the brush layer to adsorb on the silica surface presenting their methyl groups upwards. This provides a very low energy barrier for surface diffusion of the PS-PDMS diblock copolymer. These results suggest that a PDMS brush might be also effective for self-organization of other block copolymers.

It is now shown how the collective effects of mesa width, solvent vapor pressure and annealing time can be used to control the alignment of cylinders in trenches. In this experiment the period of the topographic patterns was set to 1 μm, and the width ratio of mesa to trench was varied from 0.18 to 1. The solvent vapor pressure was varied by changing the solvent surface area to annealing chamber volume ratio R within the range of 0.3 $cm^{-1}$ (designated condition A) to 0.99 $cm^{-1}$ (condition F). A higher vapor pressure causes the polymer to swell, lowers the glass transition temperature, and facilitates rearrangement of the polymer chains. The effect of R on swelling was evident from the color of the samples, which changed from grey (as-spun) to gold, violet or blue for conditions A-F.

Figure 3A:
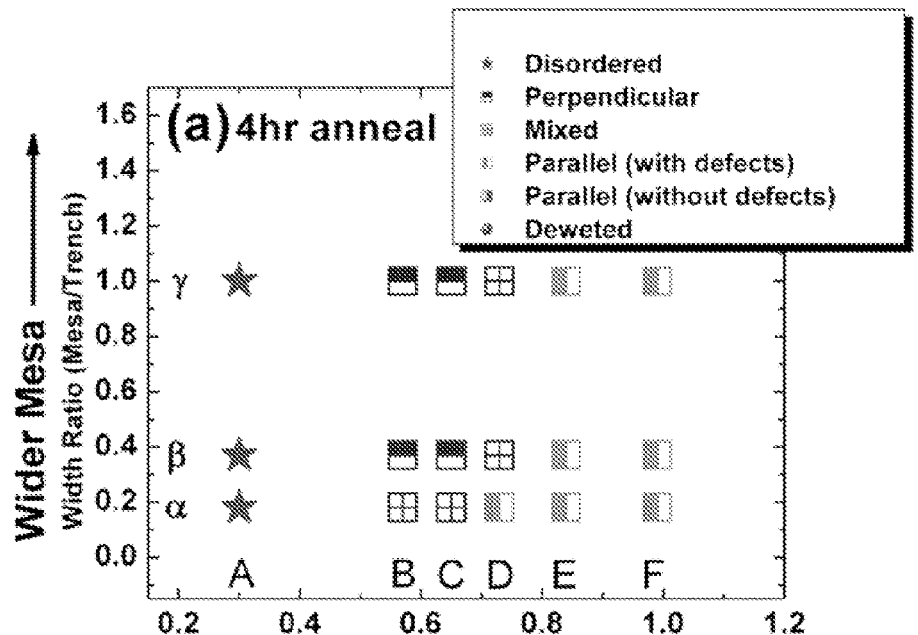
FIG. 3(a)-(b) illustrate arrangement of cylinders as a function of mesa/trench width ratio and solvent vapor pressure for 4 hour (FIG. 3(a)) and 15 hour (FIG. 3(b)) annealing times.
Figure 3B:
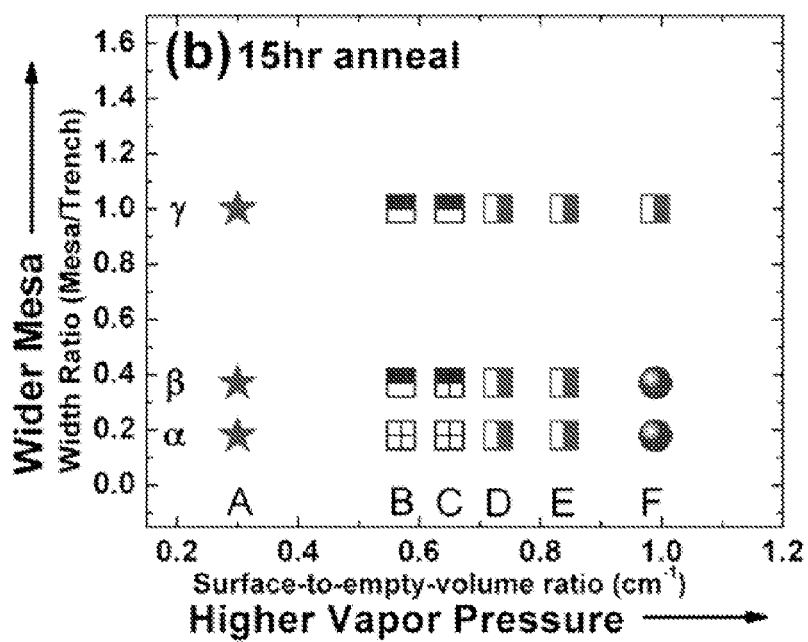
Figure 4C:
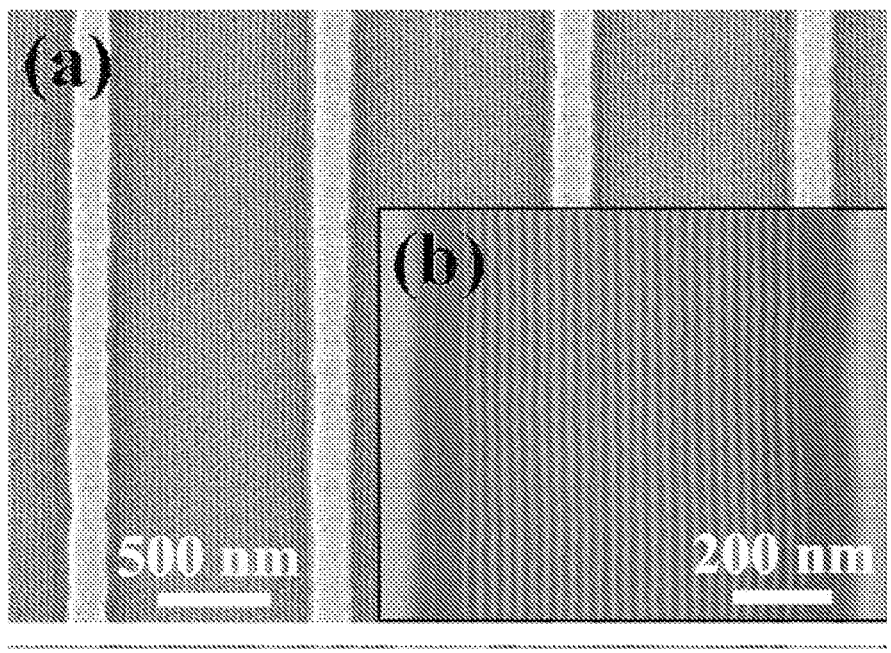
Figure 4C:
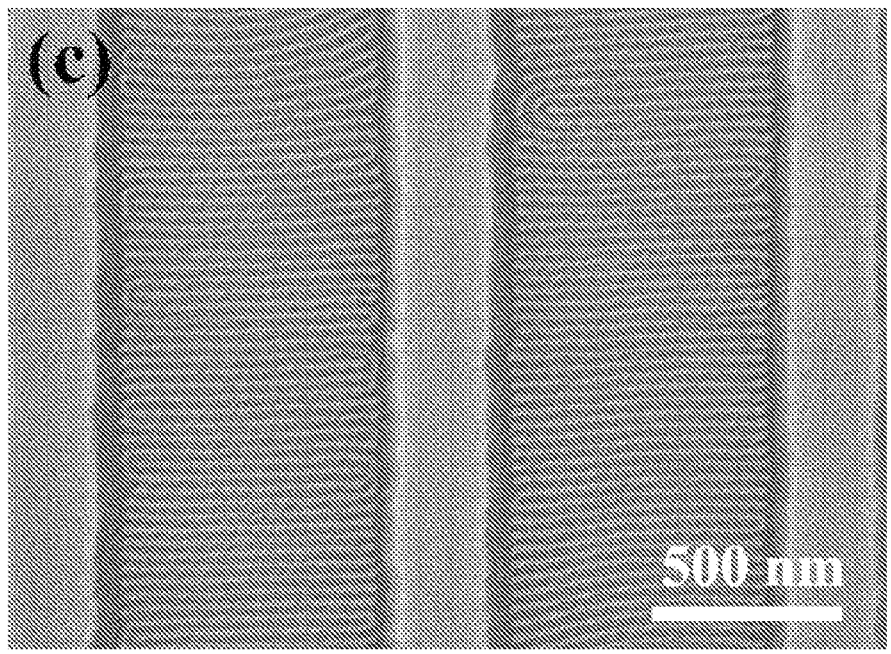

FIGS. 3a and b show systematic trends in the cylinder morphology as a function of solvent vapor pressure R and trench geometry (mesa width/trench width at constant periodicity) for two different annealing times. A low solvent vapor pressure (condition A) gives only disordered cylinders regardless of the trench geometry. In contrast, under a high vapor pressure (condition F), the cylinders align parallel to the trench edges at an early stage of annealing (4 hrs, FIG. 3a) but eventually dewet (15 hrs, FIG. 3b), particularly for wide trenches (designated α and β). At intermediate vapor pressures the cylinders can align either parallel or perpendicular to the trench edges, and defect levels decrease with increasing annealing time. At condition E, a parallel alignment of cylinders containing defects such as Y-junctions is observed after 4 hrs anneal, while 15 hrs anneal gives virtually defect-free patterns over a large scale substrate (1 cm$^2$), as shown in FIGS. 4a and b, except near the edge of the sample, where the as-spun film thickness is higher. In each trench, 26 cylinders of width 16 nm and period of 35 nm were aligned. This degree of ordering on a macroscopic scale is attributed to the large χ parameter of PS-PDMS and exceptionally low surface energy of the PDMS-brush grafted on the native oxide surface.

The ability to orient cylinders either perpendicular or parallel to the trenches by controlling the trench geometry and annealing conditions is of particular interest in nanolithography applications. Trenches with wide mesas (β and γ) and relatively low vapor pressure annealing (B and C) lead to uniformly or predominantly perpendicular orientation (FIG. 4c), despite the higher free energy of the ends of the cylinders. Perpendicular alignment of cylinders in local areas of trenches has been reported and attributed to capillary flow from mesas to trenches, perpendicular to the trench walls. Such a flow will be greater for higher mesa/trench ratios, and this mechanism could account for the observation of perpendicular cylinders only for the higher width ratios β and γ. The perpendicular or mixed orientation is metastable and is gradually replaced by the parallel orientation (see conditions Cβ, Dβ, Dγ) for longer annealing times.

Figure 5A:
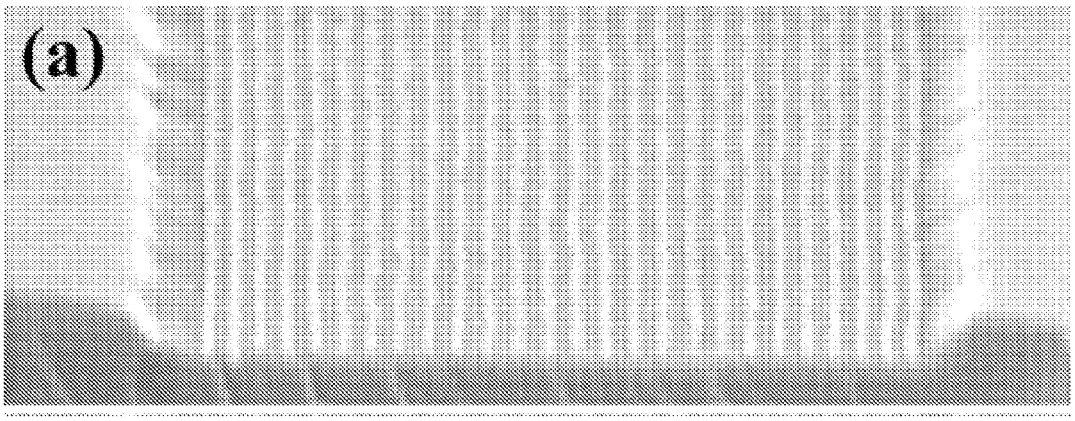
FIG. 5(a)-(b) illustrate tilted SEM images (a) before and (b) after $CF_4$ RIE for 30 seconds, in which the cylinder patterns were transferred into an underlying thin oxide film.
Figure 5B:

To illustrate pattern transfer from the PDMS cylinders into an underlying 20 nm silica layer, a $CF_4$ reactive ion etch was performed for 30 sec. Cross section images before and after pattern-transfer are presented in FIGS. 5a and b. The 20 nm silica was fully etched (the etch rate of silica under these conditions is 0.7 nm/s) to produce 'wires' that are narrower than the width of the initial oxidized PDMS cylinders, due to anisotropic etching. An etched silica layer can be used as a mask for subsequent etching by reactive ion etching or ion milling, or to form a large-area nanoimprint mold.

In summary, a Si-containing block copolymer, such as PS-PDMS, has been investigated for applications in self-assembled nanolithography. This material combines the advantages of a high χ parameter, leading to well-ordered structures with low edge roughness, and a high etch selectivity between the two blocks, providing etch-resistant masks for pattern transfer. A topographical PDMS-brush coated silica surface can be used to template in-plane cylinder arrays with long range order. Moreover, the cylinder arrays may be selectively oriented parallel or perpendicular to the trench walls by control of solvent annealing and mesa width, and the pattern can be transferred into the underlying silica. These well-controlled nanoscale PDMS patterns may have a variety of applications in the fabrication of narrow interconnect lines, nanoimprint lithography stamps, or nano-fluidic devices.

One skilled in the art will appreciate that this invention can be extended to include diblock copolymers with lamellar morphology in which the lamellar orientation can be controlled, and triblock copolymers, in which at least one block contains Si, Fe, etc. It can also be used with non-periodic substrate topography, in which different microdomain orientations can be produced on different parts of the substrate by changing the geometry of the substrate trenches in different parts of the substrate.

CONCLUSION

A system and method has been shown in the above embodiments for self-assembled nanolithography using a polystyrene-polydimethylsiloxane or other Si-containing block copolymer, in which the orientation of the block copolymer domains can be controlled. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method comprising the steps of:
   (a) applying a block copolymer on top of a trench patterned substrate having a pre-determined trench period and a pre-determined mesa to trench width ratio, the block copolymer comprising at least an organic block and a silicon-containing block;
   (b) annealing structure of (a) under a pre-determined vapor pressure for a pre-determined annealing time period, and
      wherein the pre-determined trench period, the pre-determined mesa to trench width ratio, the predetermined vapor pressure and the predetermined annealing time period are chosen such that cylinders formed in the block copolymer are either perpendicular or parallel with respect to the trench-patterned substrate.

2. The method of claim 1, wherein the method further comprises the step of subjecting structure of (b) to a plurality of plasma treatments to remove the organic block, leaving cylinders associated with the silicon-containing block on the trench-patterned substrate.

3. The method of claim 2, wherein the predetermined trench period is picked between 10 nm and 1 mm.

4. The method of claim 1, wherein the silicon-containing block is any of the following: polydimethylsiloxane, polyethylmethylsiloxane, polyphenylmethylsiloxane, polydiethylsiloxane, polyvinylmethylsiloxane, or polyferrocenyldimethylsilane.

5. The method of claim 1, wherein the organic block is any of the following: polystyrene, polyisoprene, polybutadiene, polymethylmethacrylate, polyethylene oxide, or polyvinylpyridine.

6. The method of claim 1, wherein the pre-determined vapor pressure is achieved via picking a surface to empty volume ratio R between a surface area of a liquid solvent used in the annealing and a volume of an annealing chamber used in the annealing.

7. The method of claim 6, wherein the ratio R is picked from the following range: 0.01 cm$^{-1}$ to 10 cm$^{-1}$.

8. The method of claim 1, wherein the predetermined mesa to trench width ratio is picked from the following range: 0.01 to 10.

9. The method of claim 1, wherein the pre-determined annealing time period is picked from the following range: 1 minute to 100 hours.

10. The method of claim 1, wherein the substrate is made of any of the following:
    silicon, oxidized silicon, or silica.

11. The method of claim 1, wherein the block copolymer is a triblock copolymer.

12. The method of claim 1, wherein trenches in the patterned substrate has a non-periodic substrate topography.

13. A method comprising the steps of
(c) applying a polystyrene-polydimethylsiloxane (PS-PDMS) block copolymer on top of a trench patterned substrate having a pre-determined trench period and a pre-determined mesa to trench width ratio;
(d) annealing structure of (a) under a predetermined vapor pressure for a pre-determined annealing time period, and
wherein the pre-determined trench period, the pre-determined mesa to trench width ratio, the predetermined vapor pressure and the predetermined annealing time period are chosen such that cylinders formed in the PS-PDMS block copolymer are either perpendicular or parallel with respect to the trench-patterned substrate.

14. The method of claim 13, wherein:
a. the predetermined trench period is picked between 10 nm and 1 mm;
b. the pre-determined vapor pressure is achieved via picking a surface to empty volume ratio R between a surface area of a liquid solvent used in the annealing and a volume of an annealing chamber used in the annealing, and the ratio R is picked from the following range: 0.01 cm$^{-1}$ to 10 cm$^{-1}$;
c. the predetermined mesa to trench width ratio is picked from the following range: 0.01 to 10; and
d. the predetermined annealing time period is picked from the following range: 1 minute to 100 hours.

* * * * *